(12) United States Patent
Lenz et al.

(10) Patent No.: US 11,313,498 B2
(45) Date of Patent: Apr. 26, 2022

(54) PROFILED CLAMP

(71) Applicant: NORMA Germany GmbH, Maintal (DE)

(72) Inventors: Michael Lenz, Schöneck (DE); Yassine Bennai, Vigneux sur Seine (FR); Michael Sommer, Büdingen (DE); Frank Lange, Büdingen (DE)

(73) Assignee: Norma Germany GmbH, Maintal (DE)

( * ) Notice: Subject to any disclaimer, the term of this patent is extended or adjusted under 35 U.S.C. 154(b) by 517 days.

(21) Appl. No.: 16/082,104

(22) PCT Filed: Feb. 14, 2017

(86) PCT No.: PCT/EP2017/053329
§ 371 (c)(1),
(2) Date: Sep. 4, 2018

(87) PCT Pub. No.: WO2017/148699
PCT Pub. Date: Sep. 8, 2017

(65) Prior Publication Data
US 2020/0284382 A1    Sep. 10, 2020

(30) Foreign Application Priority Data
Mar. 2, 2016  (DE) .......................... 102016103703.6

(51) Int. Cl.
*F16L 23/00*   (2006.01)
*F16L 23/08*   (2006.01)
(Continued)

(52) U.S. Cl.
CPC .............. *F16L 23/003* (2013.01); *F16B 2/08* (2013.01); *F16L 23/08* (2013.01); *F16L 33/03* (2013.01); *F16B 7/04* (2013.01)

(58) Field of Classification Search
CPC ......... F16L 23/003; F16L 23/08; F16L 33/03; F16L 33/04; F16L 33/12; F16L 21/065;
(Continued)

(56) References Cited

U.S. PATENT DOCUMENTS 973,731 A * 10/1910 Watkins
1,229,312 A * 6/1917 Newhouse
(Continued)

FOREIGN PATENT DOCUMENTS

CN   103090136 A   5/2013
DE   3520952 C1   10/1986
(Continued)

OTHER PUBLICATIONS

Chinese Office Action for Chinese Application No. 201780014618.5 dated Sep. 24, 2019 (6 pages).
(Continued)

*Primary Examiner* — Matthew Troutman
*Assistant Examiner* — William S. Choi
(74) *Attorney, Agent, or Firm* — Reising Ethington, P.C.

(57) ABSTRACT

A profiled clamp for assembling on pipe ends, having a first half-shell and a second half-shell, each of which has a clamping head at a first end and a connection geometry at a second end for releasably connecting the second end. The clamping heads are connected to a clamping element, and at least one of the two half-shells can be tilted relative to the clamping element. A spring element is arranged in the region of the clamping heads, said spring element pushing the second ends of the half-shells apart under pretension. Contact regions of the spring element can be positioned on the pipe ends in a frictionally locking manner when connecting the two ends.

15 Claims, 2 Drawing Sheets

(51) Int. Cl.
  *F16L 33/03* (2006.01)
  *F16B 2/08* (2006.01)
  *F16B 7/04* (2006.01)

(58) Field of Classification Search
  CPC ......... F16L 23/18; F16L 33/10; F16L 3/1058;
      F16L 3/1203; F16L 3/1211; F16L 23/04;
      F16L 23/10; F16B 2/08; F16B 7/04;
      Y10T 24/1412; Y10T 24/14; Y10T
      24/1457; Y10T 24/1441; Y10T 24/1451;
      Y10T 24/44923
  USPC ....... 285/365, 367, 408, 409, 410, 411, 420,
      285/319, 421, 917; 24/519, 19, 279, 280,
      24/284, 285, 24, 21, 282
  See application file for complete search history.

(56) References Cited

U.S. PATENT DOCUMENTS

| | | | |
|---|---|---|---|
| 1,319,997 A * | 10/1919 | Galloway et al. | |
| 1,398,519 A * | 11/1921 | Hosch | |
| 1,478,896 A * | 12/1923 | Ferency | |
| 4,068,966 A * | 1/1978 | Johnson | |
| 4,438,958 A * | 3/1984 | De Cenzo | 285/409 |
| 7,905,037 B1 * | 3/2011 | Holland | |
| 8,402,618 B2 * | 3/2013 | Veldhoen | |
| 8,677,571 B2 * | 3/2014 | Bowater | F16L 33/08 24/279 |
| 8,844,483 B2 * | 9/2014 | Ottersbach | |
| 9,151,421 B2 | 10/2015 | Wachter et al. | |

FOREIGN PATENT DOCUMENTS

| | | |
|---|---|---|
| DE | 202013001224 U1 | 2/2013 |
| DE | 102011117753 A1 | 5/2013 |
| GB | 785310 A | 10/1957 |
| JP | 2001141154 A | 5/2001 |
| JP | 2006083902 A | 3/2006 |
| KR | 101512506 B1 | 4/2015 |
| WO | 2016202478 A1 | 12/2016 |

OTHER PUBLICATIONS

First Korean Office Action for Korean Application No. 10-2018-7028341 dated Oct. 30, 2019 (12 pages).
English translation of First Korean Office Action for Korean Application No. 10-2018-7028341 dated Oct. 30, 2019 (11 pages).
International Search Report for PCT/EP2017/053329, dated May 11, 2017, 4 pages.
English Translation of International Search Report for PCT/EP2017/053329, dated May 11, 2017, 3 pages.
1st German Office Action for DE 10 2016 103 703.6 dated Feb. 6, 2017, 4 pages.

* cited by examiner

PROFILED CLAMP

INTRODUCTION

The present disclosure relates to a profile clamp for connecting two pipe ends, which has a first half shell and a second half shell, which each has a tensioning head at a first end and a connecting geometry at a second end for releasably connecting the second ends, wherein the tensioning heads are connected to a tensioning element and at least one of the two half shells can be tilted relative to the tensioning element, wherein a spring element is arranged in the region of the tensioning heads, which spring element presses the second ends of the half shells apart under pretension. The disclosure furthermore relates to a spring element for such a profile clamp.

Profile clamps generally serve for connecting two pipe ends, wherein they are seated on flanges at the pipe ends. During the tensioning of the profile clamps, not only is a radial retention force then generated, but, owing to the profile of the clamp band and the flange, also an axial force which presses the pipe ends toward one another.

To enable easier assembly of the profile clamp on the pipe ends, it is known to form the clamp band in the form of two half shells which are each connected via a tensioning device at their first ends and via a releasable connecting geometry at their respective second ends. The profile clamp is then seated on the pipe ends or flanges with an opened connecting geometry and a slackened tensioning device and the connecting geometry is subsequently closed. By actuating the tensioning device, the profile clamp can then be tensioned by reducing its diameter.

A profile clamp for arranging on a flange is now known from DE 10 2011 117 753 A1, which profile clamp has a first half shell and a second half shell. The half shells each have a tensioning head at a first end and a connecting geometry at an opposite second end for releasably connecting the second ends. In this case, the tensioning heads are connected to a tensioning element, wherein at least one of the two half shells can be tilted relative to the tensioning element. In this case, a spring element having two legs is provided and is held on the tensioning element such that one leg, under pretension, abuts in each case spring-pretensioned against a respective inner side of the half shells. Easier seating of the profile clamp is thus achieved since the profile clamp is retained in the opened state by the spring element until the connecting geometries are connected to one another.

The tensioning element is relatively fixedly connected e.g. to the tensioning head of the first half shell, for example in that the tensioning element is designed as a screw element and is partially screwed into a thread in the first tensioning head. The tensioning element extends through a through-hole, which is formed in particular as an elongated hole, which is incorporated in the tensioning head of the second half shell. By holding the second half shell on the tensioning element via a through hole or elongated hole, the second half shell is held on the tensioning element such that it is movable relative to the first half shell, whilst the tensioning element is partially screwed in the first tensioning head, for example. The spring element then ensures that the two half shells are retained in an opening position with respect to one another so that the two connecting geometries on the respective second ends of the half shells are opened and as far away from one another as possible. It is thus possible to arrange the profile clamp on the flange in a simple manner without the two half shells having an undefined arrangement with respect to one another. If the tensioning element in the form of a screw is screwed further into the first tensioning head, the profile clamp is braced on the flange after a connection, in particular latching, of the two connecting geometries at the second ends of the half shells.

If the profile clamp is retained, pre-positioned, on the flange by connected geometries at the second ends of the half shells, an assembly operator can subsequently actuate the tensioning element, for example in that, in the case of a screw, this is screwed into the thread in the first tensioning head. In this case, the position of the profile clamp is disadvantageously not positioned in a defined manner on the flange, which means that the profile clamp can rotate freely around the flange, for example.

SUMMARY

One object of the disclosure is to further develop a profile clamp for easier arrangement on pipe ends or flanges. In particular, it should be possible to pre-fix the profile clamp on the pipe ends in a simple manner after the connection of the second ends of the half shells and before the bracing of the tensioning heads by the tensioning element.

In an embodiment, the disclosure provides that the profile clamp, starting from the preamble of claim 1, is further developed in such a way that, during the connection of the second ends of the half shells, contact regions of the spring element can come to bear against the pipe ends in a force-locking manner.

An embodiment is therefore a functional expansion of the spring element, which, to fulfill a first function, abuts, spring-pretensioned, against the inner sides of the half shells in order to press the half shells apart in the non-connected state of the second ends. To fulfill a second function, namely a defined pre-positioning of the profile clamp on the pipe ends, contact regions, which are formed in particular on a radial inner side of the spring element, are pressed resiliently against the pipe ends to thereby achieve friction-locking retention. In this case, by connecting the second ends, the contact regions are deformed radially inward and come to bear against the pipe ends, wherein the spring element, with increasing tensioning of the profile clamp, can then come to bear against the pipe ends more and more. The forces required to tension the profile clamp therefore only increase insubstantially.

The spring element preferably has two legs and is fastened to the tensioning element such that one leg, under pretension, abuts in each case spring-pretensioned against a respective inner side of the half shells, wherein at least one of the contact regions is formed on each leg, by means of which contact regions a friction-locking retention of the profile clamp on the pipe ends can be realized during the connection of the second ends of the half shells. This achieves a simple construction of the spring element with a reliable pre-positioning of the profile clamp on the pipe ends. In this case, the contact regions on the legs of the spring element form an operative connection with the flange in such a way that friction-locking or force-locking retention is achieved. In particular, as a result of the operative connection, it is achieved that the profile clamp on the flange can no longer readily twist when the second ends of the half shells are connected to one another via the connecting geometries, even if the tensioning heads of the half shells are not yet braced together by the tensioning element. The assembly of the profile clamp is therefore facilitated considerably, especially in poorly accessible regions.

According to an embodiment of the spring element, the contact regions are formed at angled end regions of the legs.

For example, the end regions extend at an angle of 90° to 180° and preferably of 100° with respect to the legs. The angled end regions form integrally molded portions in the manner of small end arms, wherein, as a result of the angled direction of extent of the end regions, these can act as a brace between the inner side of the half shells and the outer circumference of the pipe ends under elastic deformation.

In an embodiment, a further improvement is achieved if the contact regions are formed at a bent portion of the end regions. The contact regions thus press against the pipe ends with an approximately linear contact. As a result of the bent portions, for example in the form of an end tongue, a defined contact point and a relatively high contact force are therefore produced. In particular, contact via a bordering punching burr or the like is prevented.

According to an embodiment of the profile clamp, at least the contact regions have a coating on the surface with which the friction between the contact regions and the pipe ends can be increased. In particular, the spring element can be fully surface-coated, wherein a coating in the region of the contact regions at the end of the legs is for influencing the friction between the spring element and the pipe ends.

The spring element is produced, for example, from a spring steel sheet by means of a punching and bending process. The spring element has, for example, a sheet thickness of 0.2 mm to 1 mm and preferably of 0.4 mm. In particular, the spring element preferably has a thickness of 0.3 mm to 0.6 mm. The spring element is designed such that deformations of the legs of the spring element take place predominantly in the elastic region, wherein a plastic deformation of the contact regions, in particular, after a final tightening of the profile clamp on the pipe ends can be tolerated. Repeated assembly of the profile clamp with a pre-positioning action of the spring element can be maintained in spite of the possible occurrence of a slight plastic deformation of the spring element.

For guiding the tensioning element through, the spring element has a V-shaped molded portion between the legs, in which mutually flush openings are formed through which the tensioning element extends. In this case, the spring element can be designed, in particular, such that the legs and the integrally molded end portions are symmetrical with respect to the V-shaped molded portion.

The disclosure is furthermore based on a spring element for a profile clamp for connecting two pipe ends, which has a first half shell and a second half shell, which each has a tensioning head at a first end and a connecting geometry at a second end for releasably connecting the second ends, wherein the tensioning heads are connected to a tensioning element and at least one of the two half shells can be tilted relative to the tensioning element, wherein a spring element is arranged in the region of the tensioning heads, which spring element presses the second ends of the half shells apart under pretension, wherein the spring element has contact regions according to an embodiment, which can come to bear against the pipe ends in a friction-locking manner during the connection of the second ends.

Therefore, the spring element serves not only for retaining the profile clamp or pressing the half shells apart, but, after the arrangement and closing of the profile clamp, also for securing the position on the pipe ends before the profile clamp is tensioned via the tensioning element and therefore fastened completely. It is therefore possible to dispense with an additional retainer as a pre-positioning device or anti-twist device. This reduces the complexity involved in producing the profile clamp, which can therefore be produced more economically overall.

According to an embodiment, the spring element has two legs, in the end regions of which one of the contact regions is formed in each case, by means of which contact regions a friction-locking retention of the profile clamp on the pipe ends can be realized. It is thus possible to achieve reliable pre-positioning of the profile clamp on the flange with relative little effort. In particular, the contact regions in this case are provided with a coating on the surface, with which the friction between the integrally molded portions and the flange can be increased. Reliable retention can then also be achieved with low spring forces.

BRIEF DESCRIPTION OF THE FIGURES

Further measures improving the disclosure are presented in more detail below together with the description of a preferred exemplary embodiment of the disclosure with reference to the figures, which show.

DETAILED DESCRIPTION

Figure 1:
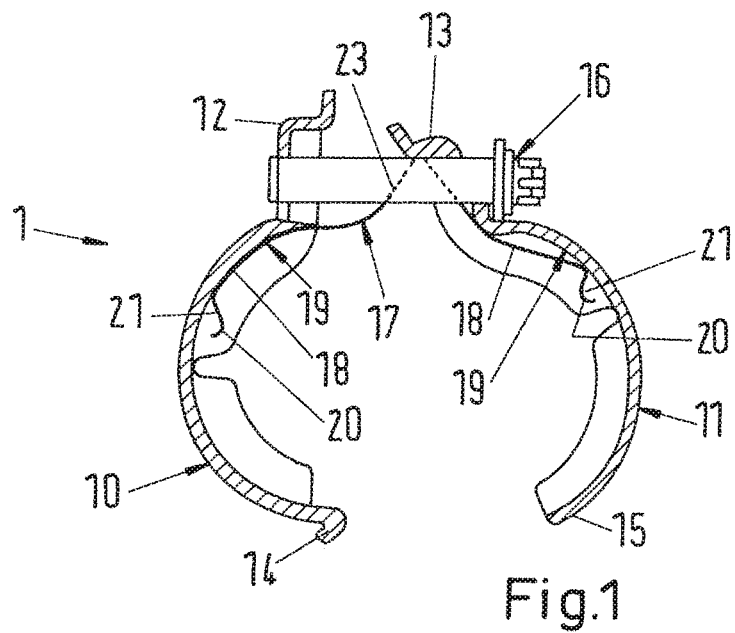
FIG. 1 a side view of a profile clamp with opened half shells, wherein, in the opening position shown, the half shells are pretensioned by a spring element.

In FIG. 1, in an embodiment, a profile clamp 1 is illustrated which has two half shells 10, 11. The profile clamp 1 or its clamp band is therefore formed in two parts as it were. The half shells 10 and 11 each have a tensioning head 12, 13 at a first end, which tensioning heads are connected to one another via a tensioning element 16. At a second, opposite end, the half shells 10, 11 each have a connecting geometry 14, 15.

A spring element 17 is fastened to the tensioning element 16 in such a way that it abuts against the inner sides 19 of the half shells 10, 11 of the profile clamp 1. In this case, the spring element 17 is pretensioned such that the second ends of the half shells 10, 11 having the connecting geometries 14, 15 are pressed away from one another and the profile clamp 1 is therefore opened. The profile clamp 1 is therefore retained in an opened position by the spring element 17 and can therefore be positioned easily, wherein the position of the half shells 10, 11 and the tensioning element 16 with respect to one another are clearly defined. In this case, the tensioning element 16 can be screwed into a thread in the tensioning head 12 so that the tensioning element 16 is arranged substantially rigidly on the first half shell 10. The second half shell 11 can be tilted accordingly on the tensioning element 16 for tilting purposes, to which end an elongated hole is incorporated in the tensioning head 13 of the second half shell 11.

The spring element 17 is designed in the form of a leaf spring and comprises a spring steel sheet, which is produced for example in a punching and bending process. A tensioning screw, which passes through the second tensioning head 13 and is screwed in the first tensioning head 12, is used as the tensioning element 16. As the tensioning screw 16 is screwed in further, the two tensioning heads 12 and 13 are drawn toward one another such that, after a prior closing of the two connecting geometries 14 and 15 at the second ends of the half shells 10 and 11, a tensioning of the profile clamp 1 takes place. To this end, the connecting geometry 14 is formed in the manner of a hook and the connecting geometry 15 has a hole-like opening into which the hook-like form of the first connecting geometry 14 can be hooked.

The spring element 17 has two legs 18 which abut against the respective inner side 19 of the half shells 10 and 11. A V-shaped molded portion 23 is formed between the two legs 18, in which V-shaped molded portion openings are formed, through which the tensioning element 16 extends so that the spring element 17 is retained on the tensioning element 16. Laterally to the V-shaped molded portion 23, the legs 18 extend approximately 180° away from one another, which legs abut under pretension against the inner sides 19 of the half shells 10, 11. Contact regions 20 are formed in end regions 21 of the legs 18. The end regions 21 then point radially inward at an angle and therefore lift away from the inner side 19 of the half shells 10, 11.

In this case, the end regions 21 form angled projections in the form of spring tongues. If the profile clamp 1 is arranged on a flange, the contact regions 20 move against the inner-lying outer side of the pipe ends and can effect a bracing of the half shells 10, 11 on the pipe ends, even when the two tensioning heads 12, 13 are not yet braced by the tensioning element 16 when the connecting geometries 14, 15 are connected to one another. In an embodiment, this results in a friction-locking fastening of the profile clamp 1 on a flange, as illustrated in more detail in the following FIG. 2.

Figure 2:
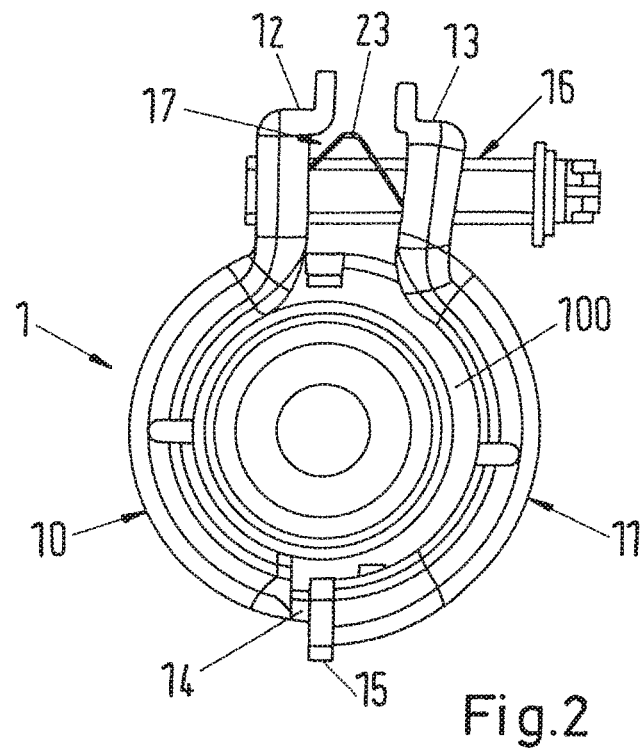
FIG. 2 a view of the profile clamp with mutually connected second ends of the half shells without the tensioning heads being braced by the tensioning element.

FIG. 2 shows the profile clamp 1 with the half shells 10, 11 and the tensioning heads 12, 13, wherein the tensioning heads 12, 13 are not yet braced by the tensioning element 16. The profile clamp 1 is seated on a flange 100 formed on a pipe end whilst the connecting geometries 14, 15 at the ends of the half shells 10, 11 are already connected to one another. In this case, the shaft of the tensioning element 16 is guided through the openings formed in the V-shaped molded portion 23 of the spring element 17. As a result of a pressure contact of the contact regions 20, which are located in the end regions 21 of the legs 18 of the spring element 17 (see FIG. 1 in this regard), against an outer circumferential face of the flange 100, the profile clamp 1 in the arrangement shown in FIG. 2 is retained on the pipe end or flange 100 in a friction-locking or force-locking manner. A final fastening of the profile clamp 1 by tightening the tensioning element 16 can then take place, as shown in FIG. 3, without the profile clamp altering its position in the circumferential direction.

Figure 3:
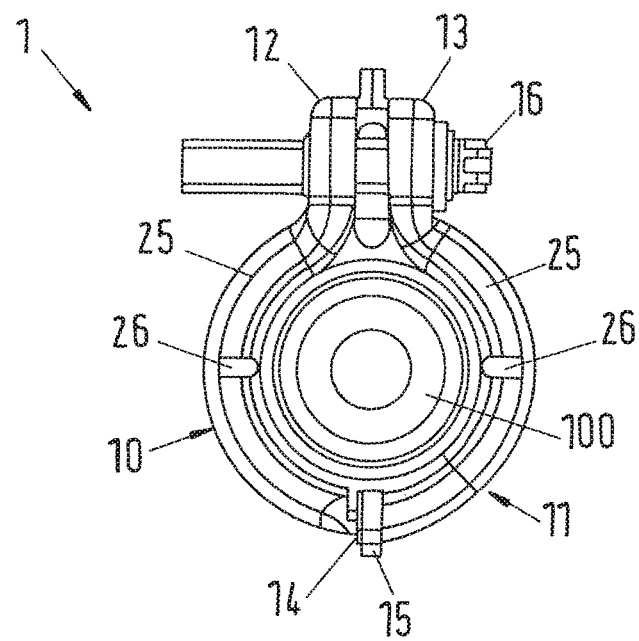
FIG. 3 a view of the profile clamp in the arrangement on a flange according to FIG. 2, wherein the tensioning heads are braced by the tensioning element.

FIG. 3 illustrates the profile clamp 1 in a closed arrangement on the flange 100 so that the two half shells 10, 11 are fixedly seated on the pipe end or flange 100 with mutually connected connecting geometries 14 and 15. The fixed arrangement is produced by a bracing of the tensioning heads 12, 13 by means of the tensioning element 16, which has resulted in a reduction in the diameter of the profile clamp, whereby radial and axial forces are introduced into the pipe ends or the flanges thereof.

In the case of the profile clamp 1 shown, interruptions 26 are incorporated in the lateral profile walls 25 of the two half shells 10, 11, whereby the profile clamp 1 can be more easily opened and seated on a connecting flange.

Figure 4:
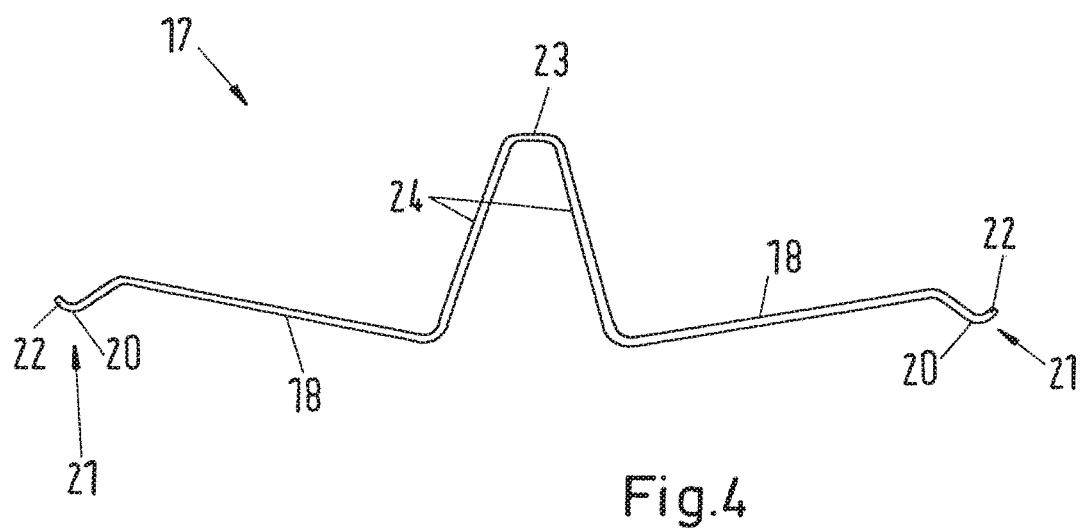
FIG. 4 a profile view of the spring element for arranging on a profile clamp according to FIG. 1.

FIG. 4 shows the spring element 17 schematically in a side view. The V-shaped molded portion 23 is arranged centrally between the legs 18. The spring element 17 is formed for example by a sheet metal strip and can have a curvature which is somewhat less that the curvature of the half shells 10, 11 so that a pretension is ensured. Openings, which form a passage 24 for the tensioning element, are incorporated in the V-shaped recess 23. In this case, the size of the openings of the screw passage 24 is dimensioned such that the tensioning element has some degree of play. A relative movement between the tensioning element and the spring element 17 or the V-shaped structure 23 is therefore enabled.

Contact regions 20 are formed in the end regions 21 of the legs 18. The end regions 21 extend at an angle of, for example, 100° with respect to the extent of the legs 18. The contact regions 20 are formed at bent portions 22 of the end regions, whereby a defined linear contact against the outer side of the flange is achieved. During the tensioning of the profile clamp, the legs 18 of the spring element then come to bear against the pipe ends more and more. Complete tensioning of the profile clamp is therefore not disrupted by the spring element.

In an embodiment, it can be provided that holding devices are formed on the outside of the pipe ends, in particular on the flanges thereof, in which holding devices the bent portions of the spring element can engage. In addition to the friction-locking connection, it is therefore possible for a form-locking fastening of the spring element or profile clamp to take place.

The spring element can also be used in conjunction with a sealing element, such as a bead seal. To this end, longitudinal slots, for example, or other fastening options, which provide sufficient movement clearance for the spring element, can be incorporated in the spring element.

In terms of its implementation, the invention is not restricted to the preferred exemplary embodiment described above. Instead, a number of variants is conceivable, which also make use of the solution presented in essentially different implementations. Even though the present description refers to pipe ends, this includes all elements of the pipe ends, in particular flanges formed on the pipe ends. All of the features and/or advantages revealed in the claims, the description or the drawings, including structural details or spatial arrangements, can be essential to the invention both in themselves and in a wide variety of combinations.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A profile clamp for connecting two pipe ends, the profile clamp comprising:

a first half shell and a second half shell, each having a tensioning head at a first end and a connecting geometry at a second end for releasably connecting the second ends, the tensioning heads being connectable to one another by a tensioning element, wherein at least one of the first half shell and the second half shell is arranged substantially rigid with respect to the tensioning element and the other half shell being tiltable relative to the tensioning element; and a spring element configured to press the second ends of the half shells apart under pretension, the spring element having two legs, each of which abut against a respective inner side of the half shells, and wherein one of the legs extends from a first end of an inverted V-shaped portion and the other from a second end of the inverted V-shaped portion, the inverted V-shaped portion of the spring element is arranged in the region of the tensioning heads and includes openings through which the tensioning element extends to retain the spring element;

wherein, at a distal end of each leg, an end region is formed that extends radially inward away from the respective inner sides of the half shells at an angle relative to the legs, wherein contact regions are formed on a radial inner side of the spring element on each end region such that during the connection of the second ends, the contact regions come to bear against the pipe ends in a friction-locking manner.

2. The profile clamp as claimed in claim 1, wherein the end regions extend at an angle of 90° to 180° with respect to the legs.

3. The profile clamp as claimed in claim 1, wherein the contact regions are formed at a bent portion of the end regions.

4. The profile clamp as claimed in claim 3, wherein the bent portions of the spring element can be inserted into the pipe end.

5. The profile clamp as claimed in claim 1, wherein at least the contact regions have a coating on the surface with which the friction between the contact regions and the pipe ends can be increased.

6. The profile clamp as claimed in claim 1, wherein the spring element is produced from a spring steel sheet by means of a punching and bending process.

7. The profile clamp as claimed in claim 6, wherein the spring element has a sheet thickness of approximately 0.2 mm to 1 mm.

8. The profile clamp as claimed in claim 1, wherein the contact regions are formed at a bent portion of the end regions, wherein the bent portions of the spring element are inserted into the pipe end in a form-locking manner.

9. A spring element for a profile clamp that connects two pipe ends, the profile clamp having first and second half shells, each of the half shells having a tensioning head at a first end and a connecting geometry at a second end for releasably connecting the second ends, the spring element comprising:

two legs, each of which abut against a respective inner side of the half shells, and wherein one of the legs extends from a first end of an inverted V-shaped portion and the other from a second end of the inverted V-shaped portion, the inverted V-shaped portion of the spring element is arranged in the region of the tensioning heads and includes openings through which a tensioning element extends to retain the spring element;

an end region formed at a distal end of each leg, the end regions extending radially inward away from the respective inner sides of the half shells at an angle relative to the legs, contact regions formed on a radial inner side of the spring element on each of the end regions such that during the connection of the second ends of the half shells, the contact regions come to bear against the pipe ends in a friction-locking manner during the closing of the half shells.

10. The spring element as claimed in claim 9, wherein at least the contact regions have a coating on the surface, with which the friction between the contact regions and the pipe ends can be increased.

11. The spring element as claimed in claim 9, wherein the contact regions are formed at a bent portion of the end regions, wherein the bent portions of the spring element are inserted into the pipe end in a form-locking manner.

12. The spring element as claimed in claim 9, wherein the contact regions are formed at a bent portion of the end regions.

13. The spring element as claimed in claim 9, wherein the spring element is produced from a spring steel sheet by means of a punching and bending process.

14. The spring element as claimed in claim 13, wherein the spring element has a sheet thickness of approximately 0.2 mm to 1 mm.

15. The spring element as claimed in claim 9, wherein the end regions extend at an angle of 90° to 180° with respect to the legs.

* * * * *